United States Patent Office.

ELI KEITH, OF WABASH, INDIANA, AND ALFRED A. EYLAR, OF PONTIAC, ILLINOIS.

*Letters Patent No. 78,672, dated June 9, 1868.*

IMPROVED COMPOSITION FOR TANNING.

*The Schedule referred to in these Letters Patent and making part of the same.*

TO ALL WHOM IT MAY CONCERN:

Be it known that we, ELI KEITH, of the city and county of Wabash, in the State of Indiana, and ALFRED A. EYLAR, of Pontiac, in the county of Livingston, and State of Illinois, have invented a new and improved Composition for Tanning; and we do hereby declare the following to be a full, clear, and exact description of the same.

The ingredients we use are four, namely:
1. Terra-japonica, gambier, cutch, or bark.
2. Lye, drained from wood ashes.
3. Common salt.
4. *Liquor aluminis compositur.*

The action of the different ingredients on the hides is as follows:

First. The terra-japonica, gambier, cutch, or bark gives color to the leather, as well as changing the gluinous substance of the hides, and converting it into leather.

Second. The lye raises the hides, acts upon the fibres of the leather, makes them strong, and also makes the leather soft and pliant.

Third. The salt is of a cooling and cleansing nature; it gives weight and a permanent softness to the leather.

Fourth. *Liquor aluminis compositur* is a powerful astringent; it contracts the fibres and fills up the leather, and, in union with the other ingredients, gives the leather weight and body.

The operation of tanning is about as follows:

We, of course, do not confine ourselves to the exact proportions or time, but give this as a mode of tanning which we have practically adopted.

The hides are limed and baited, as usual, before they are ready for our tanning process.

To tan six sides of upper leather, take—

Forty gallons of water;
Thirty-six pounds of terra-japonica, gambier, or cutch;
One gallon of lye, (strong enough to float an egg;)
Seven pounds of common salt;
One and a half gallon *liquor aluminis compositur*.

These are to be compounded as follows:

Dissolve ten pounds terra-japonica, gambier, or cutch in boiling water; then pour the solution into the forty gallons of water; then compound the other three ingredients (before adding them to the tanning-liquid) as follows:

Three pounds of salt, two quarts of lye, and two quarts of *liquor aluminis compositur;* stir and mix them well; then add them to the tanning-liquid; then stir or agitate the liquid thus compounded.

Place the hides in the liquid thus compounded, handle them up twice a day for four days; then take them out and renew the liquor by adding ten pounds terra-japonica, gambier, or cutch, dissolved as before, two pounds of salt, seven quarts of lye, and two quarts *liquor aluminis compositur*, compounded as before, and afterwards applied to the tanning-liquid. Stir and agitate; then place the hides in the liquid thus strengthened; handle them up twice a day for six days; then take the hides out and shave them, and strengthen the liquor by adding the remaining portion of the ingredients, that is to say, sixteen pounds terra-japonica, gambier, or cutch, two pounds of salt, one quart of lye, and two quarts of *liquor aluminis compositur*. The ingredients to be dissolved and compounded as previously mentioned. Place the hides in the liquor thus strengthened, and handle them up twice a day for nine days. This completes the operation of tanning.

To tan six calf-skins in ten days we use—

Thirty gallons of water.
Twenty pounds of terra-japonica, gambier, or cutch.
Three quarts of lye.
Four pounds of salt.
Nine pints of *liquor aluminis compositur*.

These ingredients are to be used as follows:

Dissolve eight pounds of terra-japonica, gambier, or cutch in boiling water, and pour the solution into the thirty gallons of water. Then compound three pints of lye, two pounds of salt, and four pints of *liquor aluminis compositur*, and add this composition to the tanning-liquid. Place the calf-skins in the liquid thus compounded, and handle them up twice a day for four days, agitating the liquid well each time of handling. Then take the calf-skins out, and renew the liquor by adding the remaining portion of the ingredients, that is to say, twelve pounds of terra-japonica, gambier, or cutch, three pints of lye, two pounds of salt, and five pints of *liquor aluminis compositur*, compounded as previously mentioned, and then added to the tanning-liquid. Place the calf-skins in the liquor thus strengthened, and handle them up twice a day for six days. This completes the operation of tanning.

To tan thirty sides of upper leather with bark, add to a sufficient quantity of bark or bark-liquid, a compound of three gallons of strong lye, four and a half gallons of *liquor aluminis compositur*, and fifteen pounds of salt. This will make the leather tan faster, with less bark; it also makes the leather stronger, and gives it weight and pliability.

Having thus described our invention, what we claim as new therein, and desire to secure by Letters Patent, is—

The tanning-composition and process, substantially as herein specified.

To the above specification of our invention we have signed our hands, this 26th day of March, 1868.

ELI KEITH,
ALFRED A. EYLAR.

Witnesses:
  OCTAVIUS KNIGHT,
  ROBERT W. SCOTT.